(12) United States Patent
Fish et al.

(10) Patent No.: US 10,663,755 B2
(45) Date of Patent: May 26, 2020

(54) DIGITAL DISPLAYS DEVICES

(71) Applicant: HEWLETT-PACKARD DEVELOPMENT COMPANY, L.P., Houston, TX (US)

(72) Inventors: Keith A. Fish, Fort Collins, CO (US); John M. Fujii, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/097,436

(22) PCT Filed: Apr. 28, 2016

(86) PCT No.: PCT/US2016/029733
§ 371 (c)(1),
(2) Date: Oct. 29, 2018

(87) PCT Pub. No.: WO2017/188955
PCT Pub. Date: Nov. 2, 2017

(65) Prior Publication Data
US 2019/0137771 A1    May 9, 2019

(51) Int. Cl.
*G02B 30/27* (2020.01)
*G02B 27/09* (2006.01)
*G02B 30/23* (2020.01)

(52) U.S. Cl.
CPC ......... *G02B 30/23* (2020.01); *G02B 27/0988* (2013.01); *G02B 30/27* (2020.01)

(58) Field of Classification Search
CPC .................. G02B 27/2207; G02B 27/2214
See application file for complete search history.

(56) References Cited

U.S. PATENT DOCUMENTS

| | | | |
|---|---|---|---|
| 6,801,243 B1 * | 10/2004 | Van Berkel | G02B 27/2214 348/59 |
| 7,027,664 B2 | 4/2006 | Lee et al. | |
| 7,327,410 B2 | 2/2008 | Cho et al. | |
| 8,254,026 B2 * | 8/2012 | Hong | H04N 13/305 359/463 |
| 8,305,426 B2 | 11/2012 | Matsubara | |

(Continued)

OTHER PUBLICATIONS

Kitamura, Yoshifumi, et al., "Interactive Stereoscopic Display for Three or More Users", Graduate School of Engineering, Osaka University, Osaka, 565-0871, Aug. 12-17, 2001, 9 pages.

*Primary Examiner* — Irfan Habib
(74) *Attorney, Agent, or Firm* — Michael A. Dryja

(57) ABSTRACT

Techniques relating to providing three dimensional view of an image to the viewers of a digital display device are described. For example, a filtration mask is implemented on the digital display device, the filtration mask includes multiple super masks arranged based on an aspect ratio of the digital display device. Each of the multiple super masks includes at least one left eye pixel mask visible to left eye of a viewer and at least one right eye pixel mask visible to right eye of the viewer. Further, the at least one left eye pixel mask and at least one right eye pixel mask are arranged in a predefined pattern. Furthermore, at least two super masks from amongst the multiple super masks include the at least one left eye pixel mask and the at least one right eye pixel mask arranged in a mutually different predefined pattern.

12 Claims, 6 Drawing Sheets

(56) References Cited

U.S. PATENT DOCUMENTS

| | | | | |
|---|---|---|---|---|
| 8,493,440 B2* | 7/2013 | Krijn | .................... | H04N 13/305 |
| | | | | 348/59 |
| 8,542,432 B2* | 9/2013 | Robinson | ............ | H04N 13/305 |
| | | | | 359/316 |
| 8,995,045 B2* | 3/2015 | Tatsuta | .................. | G02B 26/02 |
| | | | | 359/291 |
| 9,164,285 B2* | 10/2015 | Whangbo | ........... | G02B 27/2214 |
| 9,709,723 B2* | 7/2017 | Harrold | ................ | G02B 6/0028 |
| 9,740,034 B2* | 8/2017 | Woodgate | ............. | G02F 1/13338 |
| 9,971,185 B2* | 5/2018 | Kimura | ............. | G02F 1/133512 |
| 10,129,533 B2* | 11/2018 | Chen | .................. | G02B 27/2214 |
| 10,225,540 B2* | 3/2019 | Grossmann | .......... | H04N 13/106 |
| 10,321,123 B2* | 6/2019 | Sommerlade | ........ | H04N 13/344 |
| 10,527,862 B2* | 1/2020 | Pijlman | .................. | G02B 30/27 |
| 10,534,190 B2* | 1/2020 | Zhang | ............... | G02F 1/134309 |
| 10,534,208 B2* | 1/2020 | Koito | .................... | G02F 1/1323 |
| 2011/0157322 A1* | 6/2011 | Bennett | ..................... | G06F 3/14 |
| | | | | 348/51 |
| 2013/0050817 A1 | 2/2013 | Sumi | | |
| 2013/0057575 A1* | 3/2013 | An | ....................... | H04N 13/356 |
| | | | | 345/619 |
| 2013/0113786 A1 | 5/2013 | King | | |
| 2013/0321720 A1 | 12/2013 | Inada | | |
| 2013/0335538 A1* | 12/2013 | Shestak | .................. | H04N 13/31 |
| | | | | 348/54 |
| 2014/0253695 A1 | 9/2014 | Kassouf | | |

\* cited by examiner

DIGITAL DISPLAYS DEVICES

BACKGROUND

Use of display devices has phenomenally changed during the last decade where use of digital displays, as opposed to analog electronic instrumentation displays, has considerably increased. Liquid Crystal Display (LCD) displays and Light Emitting Diode (LED) displays are commonly employed as digital display means for displaying information. Such display devices present two dimensional (2D) information to viewers. Some techniques to enable a 2D display device to display 3D information utilize a polarization mask and selectively display certain pixels to right eye of the viewer and other pixels to left eye of the viewer.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
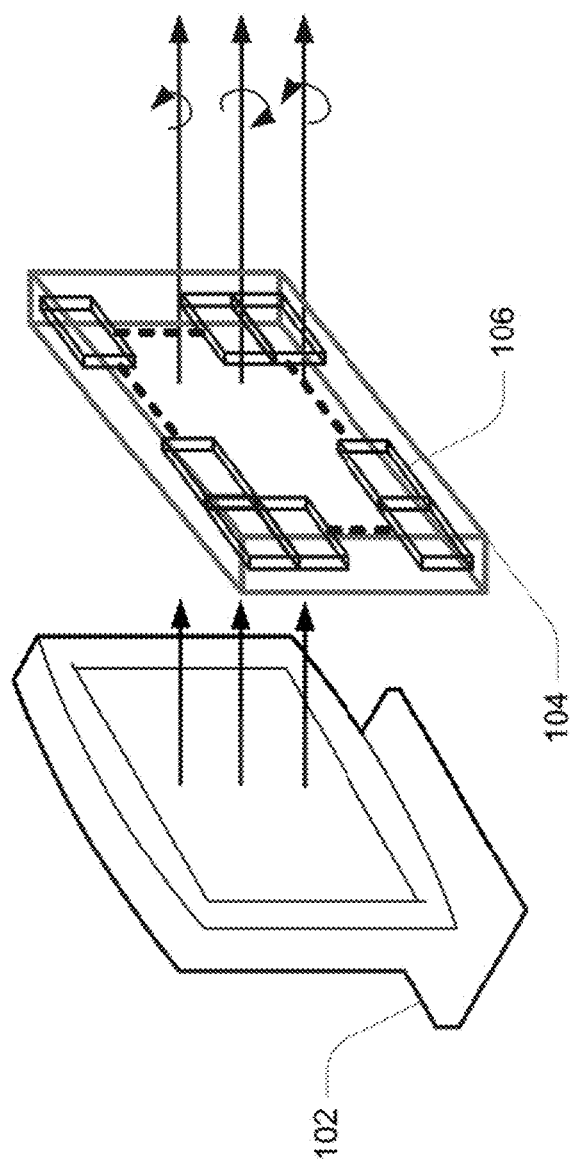
FIG. 1 illustrates a digital display device implementing a filtration mask, according to an example implementation of the present subject matter.

The present subject matter relates to techniques of providing three dimensional (3D) view of an image for the viewers of a digital display device.

Users wish to enhance their visual experience, such as that of viewing architectural designs, product designs, movies or playing games. Accordingly, demand of viewing images in three dimensions (3D) instead of in two dimensions (2D) have been ever increasing.

Generally, display panel manufacturers utilize polarization masks in digital display devices capable of displaying 2D images to create binocular disparity and generate a stereoscopic visual effect. In operation, the polarization mask polarizes light from the pixels of the digital display device, which when passed through polarized lenses can be viewed by one eye of the viewer differently than the other eye, such that two slightly differently positioned images are seen by the two eyes. A simultaneous view of two differently positioned images by the viewer cause generation of the stereoscopic visual effect, which enables the viewer to experience 3D effect while viewing the digital display device.

However, the polarization masks generally vary the visibility of pixels for the left and right eye in either the horizontal direction or, in the vertical direction across the display. That is, the view of left and right eye is varied by either providing different visibility of row pixels to the left and right eye (horizontal direction), or by providing different visibility of column pixels to the left and right eye (Vertical direction). The use of such polarization masks cause the left and the right eye to have squished aspect ratio, such that either the horizontal or the vertical aspect ratio is reduced. Further, the use of such techniques also cause vision fatigue and ghosting effects while displaying images in 3D.

According to an implementation of the present subject matter, techniques of providing three dimensional (3D) view of an image to the viewers of a digital display device are described. The techniques of the present subject matter allow a digital display device, capable of displaying 2D images, to display the images in 3D by utilization of a filtration mask.

The filtration mask may be arranged over a digital display device, such that the light being emitted by the pixels of the digital display device is filtered by the filtration mask. In an example implementation of the present subject matter, the filtration mask may be formed by a combination of multiple super masks, arranged as per the aspect ratio of the digital display device. Further, each super mask may include multiple left eye pixel masks and multiple right eye pixel masks arranged in a predefined pattern. Furthermore, each left eye pixel mask may polarize light such that it is visible to left eye of the viewer and each right eye pixel mask may polarize light such that it is visible to right eye of the viewer.

Therefore, the filtration mask of the present subject matter can be understood as a combination of different super masks with different predefined pattern arrangements of the multiple right eye pixel masks and multiple left eye pixel masks. The configuration of the different super masks and the left eye pixel masks and the right eye pixel masks may vary depending upon various implementations of the present subject matter to provide enhanced stereoscopic visual effect to the viewer.

In an example implementation of the present subject matter, some of the super masks within the filtration mask may include a first predefined pattern of arrangement of the right eye pixel masks and the left eye pixel masks, while other super masks within the filtration mask may include a second predefined pattern of the right eye pixel masks and the left eye pixel masks. The super masks with first predefined pattern and the super mask with the second predefined pattern may be randomly arranged to form the filtration mask. Accordingly, it would be noted that the different super masks, arranged within the filtration mask, may include the left eye pixel masks and the right eye pixel masks arranged in different predefined patterns.

In an example implementation of the present subject matter, the arrangement of the super masks within the filtration mask may be such that at least two super masks within the filtration mask have the left eye pixel masks and the right eye pixel masks arranged in different predefined patterns. In another example implementation of the present subject matter, the multiple super masks within the filtration mask may be arranged such that repeated pixels of either the left eye or the right eye are minimized in any direction. Such an arrangement of the super masks with different predefined pattern of the left eye pixel masks and the right eye pixel masks provides a better stereoscopic view of the image with no reduced aspect ratio and minimum visual artifacts, thereby enhancing viewer's 3D viewing experience.

In operation, the filtration mask, including a configuration of the super masks may be arranged over a digital display device. The digital display device may receive digital signals to display an image, and may operate the pixels of the display to project the image to the viewers. It would be noted that the pixels of the display may be operated based upon the configuration of the filtration mask being used. That is, the pixels of the display may be operated such that left eye information is displayed by pixels disposed with left eye pixel masks and the right eye right information is displayed by pixels disposed with eye pixel masks.

The example implementations of the described techniques not merely provide 3D view of an image to the viewers, but also provides a 3D view at unchanged aspect ratio. Further, the implementation of the described filtration mask may also provide 3D display functionality to existing 2D digital display devices at low costs.

The above techniques are further described with reference to FIG. 1 to FIG. 6. It should be noted that the description and the figures merely illustrate the principles of the present subject matter along with examples described herein and, should not be construed as a limitation to the present subject matter. It is, thus, understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 illustrates a digital display device 102, implementing a filtration mask 104, according to an example of the present subject matter. In an example implementation, the filtration mask 104 may include multiple super masks 106 arranged as per the aspect ratio of the digital display device 102. The super mask 106 may be arranged in a manner such that the filtration mask 104, thus formed, can be arranged over the digital display device 102.

In an example, the digital display device 102 may include any digital display, such as Electroluminescent display (ELD), Electronic paper display, Gyricon display, Light emitting diode display (LED), Liquid-crystal display (LCD), Plasma display panel (PDP), Organic light-emitting diode (OLED) display, active-matrix OLED (AMOLED), Organic light-emitting transistor (OLET) display, Surface-conduction electron-emitter display (SED), Quantum dot display, MEMS display, Ferro liquid crystal display (FLCD), and Telescopic pixel display (TPD).

According to an example of the present subject matter, the digital display device 102 may include a plurality of pixels depending upon the resolution of the digital display device 102. For example, a LED display may provide a 4K resolution in 3840 pixels×2160 pixels arrangement by including about 8.3 megapixels. Further, the digital display device 102 may include the pixel distribution in any given aspect ratio, such as 4:3, 16:9, 16:10, and 21:9. Accordingly, the digital display device 102 may include a defined resolution and a defined aspect ratio to include a defined number of pixels.

Further, the filtration mask 104 may be arranged over the digital display device 102 to filter light from the pixels of the digital display device 102 and selectively make some of the pixels visible to the left eye of the viewer, and some pixels visible to the right eye of the viewer. The filtration mask 104 may be formed from multiple left eye pixel masks (now shown) and multiple right eye pixel masks (now shown). Such left eye pixel masks and right eye pixel masks may be arranged in a predefined patter to form the super masks 106, which may further be arranged, as per the aspect ratio of the digital display device 102, to form the filtration mask 104. In an example implementation of the present subject matter, each super mask 106 may either be of same size arranged to form the filtration mask 104, or may be of different sizes, arranged to form the filtration mask 104.

Each of the left eye pixel mask and the right eye pixel mask may be understood as a mask covering a pixel of the digital display device 102. Accordingly, the filtration mask 104 may include 8.3 mega left and right eye pixel masks for a digital display device 102 with 4K resolution. Although each left eye pixel mask and the right eye pixel mask has been described to cover one pixel of the digital display device 102, it would be noted that in some examples of the present subject matter, each of the left eye pixel mask and the right eye pixel mask may cover more than one pixels of the digital display device 102. It would be noted that in such situation, the total number of right eye pixel masks and the left eye pixel masks may vary, to form the filtration mask 104.

In operation, each left eye pixel mask may filter light such that the pixel beneath the left eye pixel mask is visible to the left eye of the viewer. Similarly, the right eye pixel mask may filter light such that the pixel beneath the right eye pixel mask may be visible to the right eye of the viewer. For the ease of explanation the pixels that may be visible by the left eye of the viewer have been referred to as left eye buffer, and the pixels that may be visible by the right eye of the viewer have been referred to as right eye buffer, hereinafter. It would be noted that the pixels of the display may be based upon the configuration of the filtration mask 104 being utilized. That is, the pixels of the display may be operated such that left eye information is displayed by pixels disposed with left eye pixel masks and the right eye right information is displayed by pixels disposed with eye pixel masks.

In an example implementation of the present subject matter, the filtration mask 104 may be a polarization mask implementing polarization technique to filter light from the pixels of the digital display device 102. For example, the left eye pixel masks may polarize light such that pixels beneath the left eye pixel masks are visible by the left eye of the viewer, and the right eye pixel masks may polarize light such that pixels beneath the right eye pixel masks are visible to the right eye of the viewer.

Similarly, in other implementations of the present subject matter, the filtration mask 104 may be implemented as an anaglyph filter where some pixels of the digital display device 102 are filtered in one color while other pixels of the digital display device 102 are filtered in another color.

It would be noted that the viewer may wear a viewing device, such as a head gear or filter glasses to enable viewing of the pixels overlaid with the left eye pixel masks by the left eye of the viewer and enable viewing of the pixels overlaid with the right eye pixel masks by the right eye of the viewer. This may provide passive stereo viewing of the digital display device 102.

Figure 2:
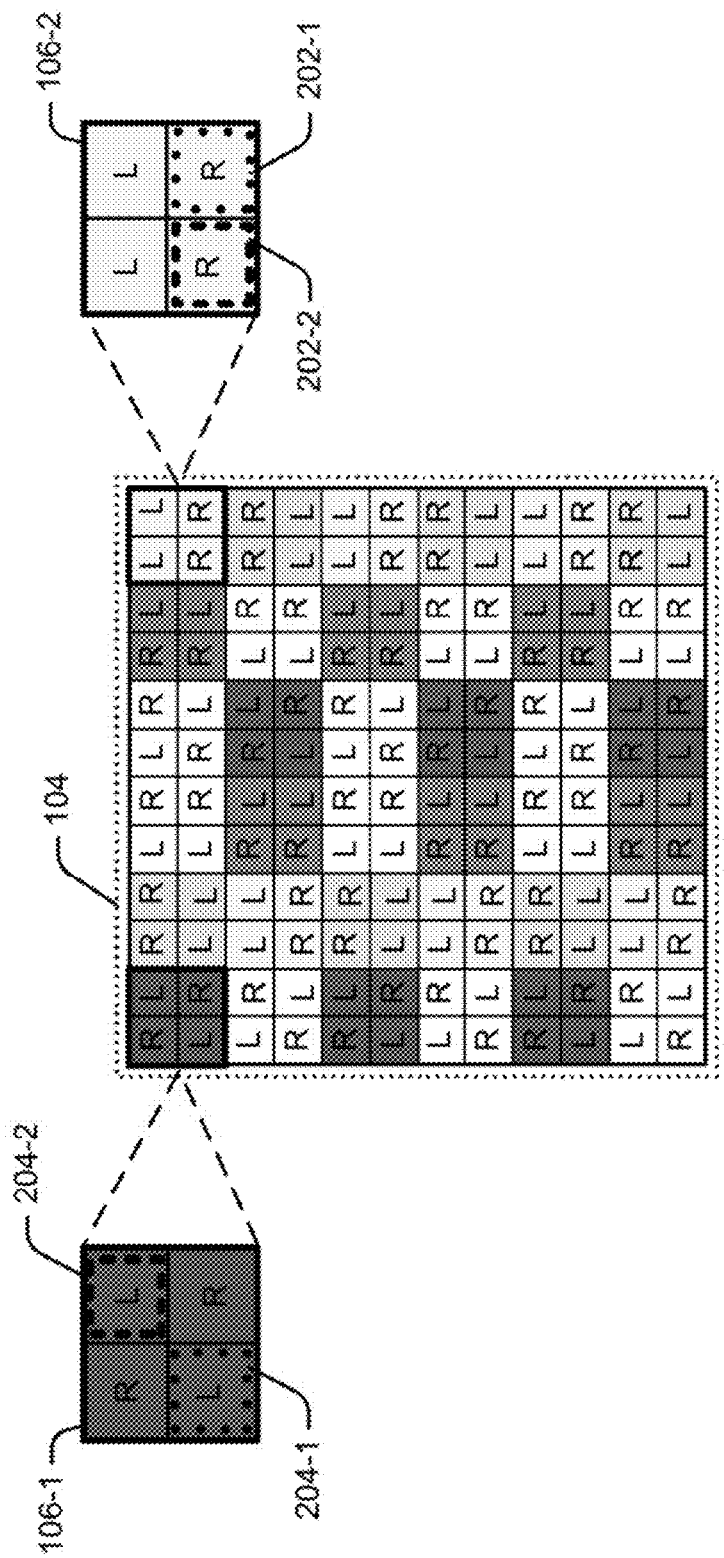
FIG. 2 illustrates an example structure of the filtration mask, according to an example implementation of the present subject matter.
Figure 3:
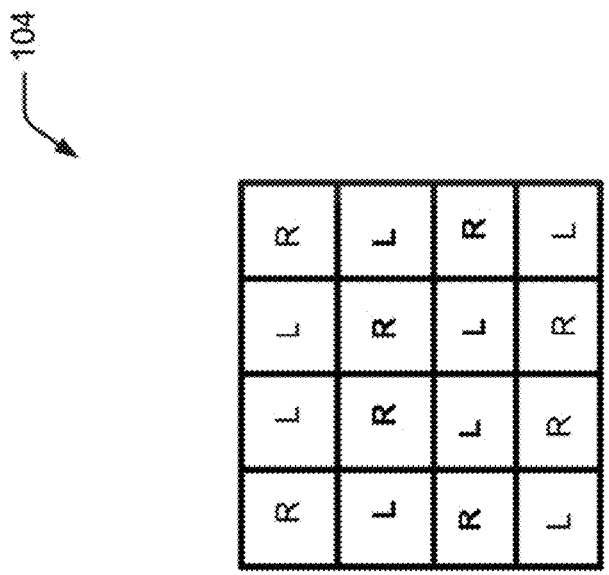
FIG. 3 illustrates a super mask, according to an example implementation of the present subject matter.

The arrangement of super masks 106 to form the filtration mask 104 and the arrangement of left eye pixel masks and the right eye pixel masks within each super mask 106 has been further explained in reference to FIG. 2 and FIG. 3.

FIG. 2 illustrates an example filtration mask 104 formed by multiple super masks 106, in accordance with an implementation of the present subject matter. The filtration mask 104 may include super masks 106, such as super masks 106-1 and 106-2. Each super mask 106 may include multiple right eye pixel masks 202-1 and 202-2, and multiple left eye pixel masks 204-1 and 204-2. For the ease of explanation, the right eye pixel masks 202-1 and 202-2 have been commonly referred to as right eye pixel masks 202 and the left eye pixel masks 204-1 and 204-2 have been commonly referred to as left eye pixel masks 204, hereinafter.

In an example implementation of the present subject matter, the filtration mask 104 may be arranged on a digital display device 102 including 144 pixels, evenly distributed across length and breadth of the display. Accordingly, the filtration mask 104 may include a total of 144 left eye pixel masks 204 and right eye pixel masks 202 distributed in different predefined pattern arrangement within multiple super masks 106. The filtration mask 104 may, therefore, include 12 columns and 12 rows distributed with right eye pixel masks 202 and left eye pixel masks 204.

In an example implementation, the filtration mask 104 may be formed by an arrangement of 2×2 super masks 106. A 2×2 super mask 106 can be understood as a super mask which includes 2 right eye pixel masks 202 and 2 left eye pixel masks 204 arranged in a form of 2×2 matrix. Accordingly, it would be noted that the filtration mask 104 may include a total of 36 super masks 106, and each super mask 106 including a total of 4 right eye pixel masks 202 and left eye pixel masks 204, arranged in a predefined pattern. Therefore, the filtration mask 104 can also be understood to include 6 columns of super masks 106 and 6 rows of super masks 106, such that each row of super masks 106, or each column of super masks 106 includes 6 super masks 106.

Although the display of the digital display device 102 has been explained to include a total of 144 pixels, it would be noted that the display may include more pixels. For example, in a digital display device 102 of High Definition (HD) resolution, there may be a total of about 2.1 megapixels. Accordingly, the filtration mask 104 may include a total of about 2.1 mega right eye pixel masks 202 and left eye pixel masks 204 distributed within multiple super masks 106 to form the filtration mask 104.

In an example implementation of the present subject matter, the super masks 106 within the filtration mask 104 may be arranged in different 'm×n' order. For example, the FIG. 2 describes 2×2 super masks 106 arranged to form the filtration mask 104. Similarly the super masks 106 may also be arranged in orders, such as 3×3, 3×4, 2×3, 4×4, 4×2, 5×5, and 5×4 in various example implementations of the present subject matter.

Referring to FIG. 2, the super masks 106-1 and 106-2 may include different predefined pattern of the left eye pixel masks 204 and the right eye pixel masks 202. For example, the super mask 106-1 includes the right eye pixel masks 202 and the left eye pixel masks 204 arranged diagonally opposite to each other to form a square arrangement of 2×2. On the other hand, the super mask 106-2 may include the right eye pixel mask 202-1 aligned in a row with another right eye pixel mask 202-2 along with two left eye pixel masks 204 to form a square arrangement of 2×2.

Similar to the super masks 106-1 and 106-2, other super masks 106 within the filtration mask 104 may also include different predefined pattern of the right eye pixel masks 202 and the left eye pixel masks 204. Also, according to an example implementation of the present subject matter, the different super masks 106 with different predefined pattern arrangement of the right eye pixel masks 202 and left eye pixel masks 204 may be distributed all across the filtration mask 104. For example, the arrangement of right eye pixel masks 202 and the left eye pixel masks 204 in the super mask 106-1 may intermittently repeated in the 1$^{st}$ column of super masks 106 from amongst the 6 columns of super masks 106. The same arrangement of the right eye pixel masks 202 and the left eye pixel masks 204 may also be further included in 4$^{th}$ column of the super masks 106.

In an example implementation of the present subject matter, the super masks 106 within the filtration mask 104 may be arranged such that repetition of the right eye pixel masks 202 and the left eye pixel masks 204 is minimized in any direction. Such an arrangement of the super masks 106 may allow to provide enhanced stereoscopic visual effect for the viewers, thereby enhancing the viewing experience.

The use of the filtration mask 104 with different super masks 106 such that at least two super masks 106 include different arrangement of right eye pixel masks 202 and left eye pixel masks 204 may reduce generation of visual artifacts.

FIG. 3 represents a filtration mask 104, according to an implementation of the present subject matter. The filtration mask 104 may include 16 pixels distributed in a 4×4 matrix arrangement. Further, the 4×4 matrix arrangement of the right eye pixel masks 202 and the left eye pixel masks 204 may include 4 super masks 106 of 2×2 arrangement. The described filtration mask 104 depicts a simple arrangement of right eye pixel masks 202 and left eye pixel masks 204 within the filtration mask 104. As described earlier, the predefined pattern of the super masks 106 may vary in the adjacent blocks to minimize visual artifacts, however the super masks 106 with similar predefined pattern of right eye pixel masks 202 and left eye pixel masks 204 may repeat to form the filtration mask 104.

In an example implementation of the present subject matter, the filtration mask 104 may be operated in two different modes, a reduced resolution mode and a pseudo-interleaved mode.

Figure 4:
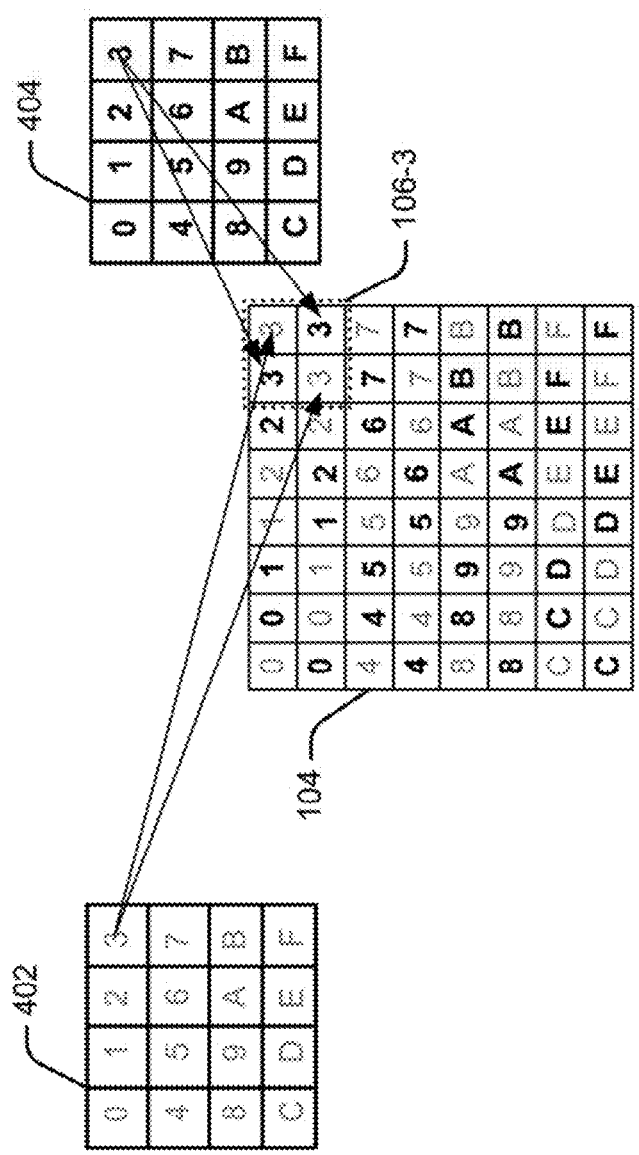
FIG. 4 illustrates a filtration mask operated in a reduced resolution mode, according to an example implementation of the present subject matter.

FIG. 4 illustrates a filtration mask 104, operating in a reduced resolution mode. The filtration mask 104 as depicted in FIG. 4, may be arranged on a display of 8×8 resolution with an evenly distributed pixel arrangement. Accordingly, the filtration mask 104 may include a total of 64 right eye pixel masks 202 and left eye pixel masks 204, arranged evenly across the length and breadth of the filtration mask 104.

In operation, according to an example implementation of the present subject matter, in a reduced resolution mode, the digital display device 102 may display content such that each pixel is mapped to a super mask 106. That is, content to be displayed by each pixel of the digital display device 102, may now be displayed by a super mask 106 of the filtration mask 104.

Further, the content of the pixel being mapped to a super mask 106 may be individually displayed by left eye pixel masks 204 and right eye pixel masks 202 within the super mask 106. For example, refer to FIG. 4 and consider location '3' to be displayed by the top right corner pixel of the digital display device 102. While operating in the reduced resolution mode, the filtration mask 104 may operate such that a 2×2 super mask 106-3 may display the value at the location '3' through the right eye pixel masks 202 and left eye pixel masks 204 arranged within the super mask 106-3. In an example, the super mask 106-3 may include two left eye pixel masks 204 and two right eye pixel masks 202 arranged in a predefined pattern. Similarly, other information to be displayed by other pixels at different locations of the digital display device 102 may be displayed by the super masks 106 of the filtration mask 104.

Accordingly, it would be noted that the resolution of the display visible to each eye of the viewer may be reduced during the operation of the reduced resolution mode. In a reduced resolution mode, a reduced resolution of right eye buffer such as a right eye buffer 402, 4×4 instead of 8×8, may be visible to the left eye of the viewer. Similarly, a reduced left eye buffer such as a left eye buffer 404, 4×4 instead of 8×8, may be visible to the right eye of the viewer.

Therefore, while the information of each pixel of the digital display device 102 is provided by a 2×2 super mask 106, the visible resolution, as viewed by the viewer, may become $\frac{1}{4}^{th}$ of the actual resolution of the digital display device 102. Similarly, if the information of each pixel is provided by a 4×4 super mask 106, the visible resolution may become $\frac{1}{16}^{th}$ of the actual resolution of the digital display device 102.

In an example, a digital display device 102 with a resolution of 4K (3840×2160) may be implemented with a filtration mask 104 formed by multiple 2×2 super masks 106. If in such an implementation, the filtration mask 104 is operated in the reduced resolution mode, the visible resolution may be reduced to 1920×1080. It would be noted that while the visible resolution may be reduced, the aspect ratio of the display may remain unchanged and an enhanced stereoscopic visual effect may be generated, thereby providing enhanced viewer experience.

In an example implementation of the present subject matter, the reduced resolution mode may allow generation of stereoscopic visual effect by reducing the visible resolution of the digital display device 102.

Figure 5:
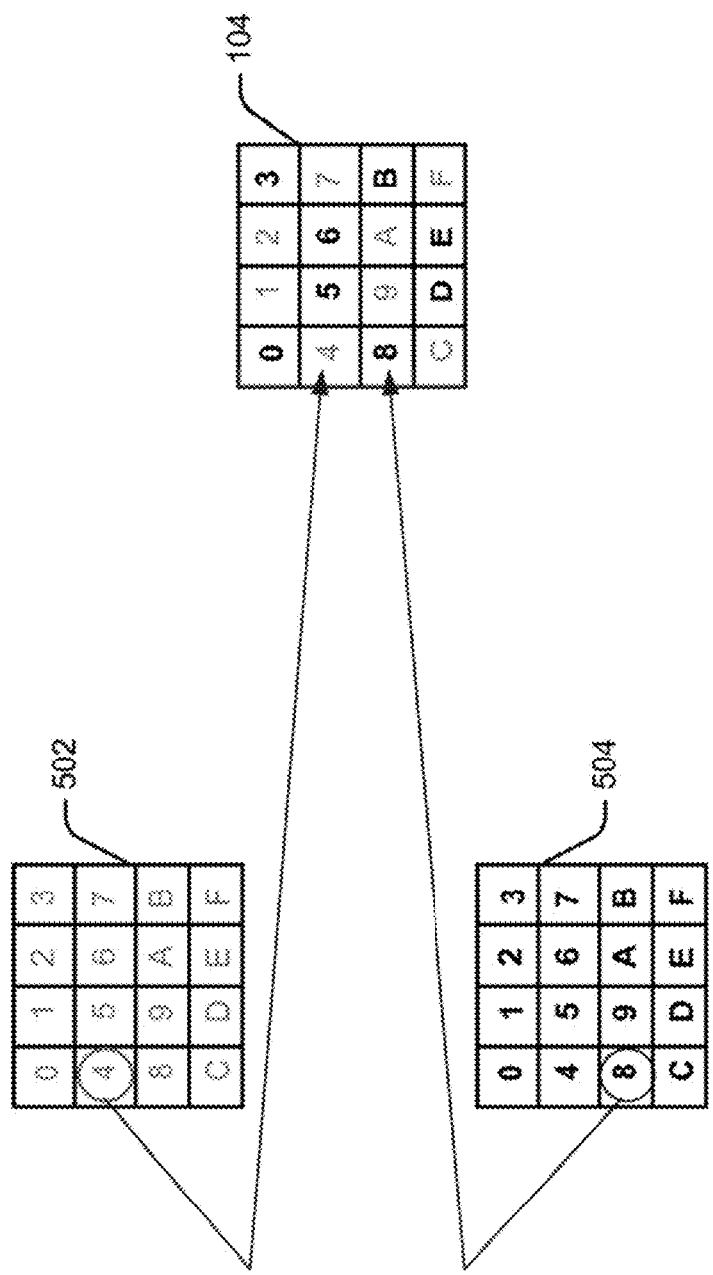
FIG. 5 illustrates a filtration mask operated in a pseudo-interleaved mode, according to an example implementation of the present subject matter.

FIG. 5 illustrates a filtration mask 104, operating in a pseudo-interleaved mode. The filtration mask 104, as depicted in FIG. 5, may be arranged on a display of 4×4 resolution with an evenly distributed pixel arrangement. Accordingly, the filtration mask 104 may include a total of 16 right eye pixel masks 202 and left eye pixel masks 204, arranged evenly across the length and breadth of the filtration mask 104.

In operation, according to an example implementation of the present subject matter, in a pseudo-interleaved mode, the digital display device 102 may display content such that each pixel of the digital display device 102 is mapped to either a left eye pixel mask 204, or a right eye pixel mask 202. That is, content to be displayed by each pixel of the digital display device 102, may now be displayed by either a right eye pixel mask 202, or a left eye pixel mask 204. While the content may be displayed by the right eye pixel masks 202 and the left eye pixel masks 204, the distribution of the left eye pixel masks 204 and right eye pixel masks 202 may be such that each row, or each column of the filtration mask 104 includes interleaved right eye pixel masks 202 and the left eye pixel masks 204.

For example, in the filtration mask 104 depicted in FIG. 5, two pixels from each row may be visible to each eye of the viewer. Referring to the first row of the filtration mask 104, the location '0' may be filtered by a left eye pixel mask 204 such that it is visible to the left eye of the viewer. However, the location '1' may be filtered by a right eye pixel mask 202 such that it is visible to the right eye of the viewer. Similarly, the location '4' displayed in second row and first column of the filtration mask 104 may be filtered by the left eye pixel mask 204. Therefore, the pixels visible to the right eye and the left eye of the viewer may be pseudo interleaved to display the content to the viewer.

It would be noted that the pseudo-interleaving may drop some pixels for the right eye and some pixels for the left eye of the viewer, however, the implementation of the pseudo-interleaved mode may allow display of the content at the resolution of the digital display device 102.

Figure 6:
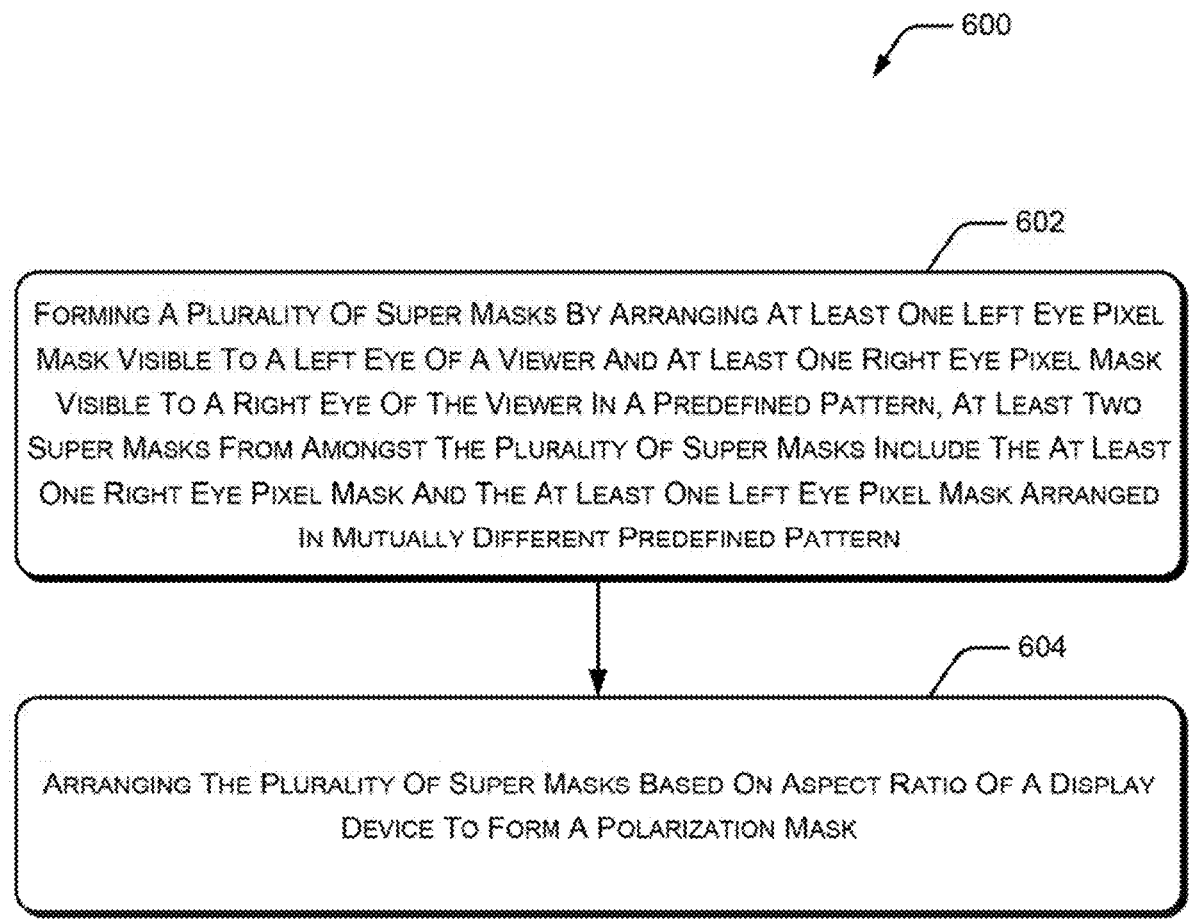
FIG. 6 illustrates a method of fabricating the filtration mask, according to an example implementation of the present subject matter.

FIG. 6 illustrates a method 600 for fabricating a filtration mask, in accordance with an example implementation of the present subject matter. The order in which the method 600 is described is not intended to be construed as a limitation, and any number of the described method blocks may be combined in any order to implement the method 600, or any alternative methods. Furthermore, the method 600 may be implemented by electronic circuits, or processor(s) through any suitable hardware, or combination thereof for fabrication of the filtration mask.

Referring to FIG. 6, in an example implementation of the present subject matter, at block 602, a plurality of super masks may be formed by arranging at least one left eye pixel mask visible to a left eye of a viewer and at least one right eye pixel mask visible to a right eye of the viewer, in a predefined pattern. In an example implementation of the present subject matter, at least two super masks from amongst the plurality of super masks include the at least one right eye pixel mask and the at least one left eye pixel mask arranged in mutually different predefined pattern.

Further, at block 604, the plurality of super masks may be arranged based on aspect ratio of a digital display device to form the filtration mask. The filtration mask, thus formed, may filter the light emitted by the pixels of the digital display device to generate two different images for the right and left eye of the viewer, to create a stereoscopic visual effect.

We claim:

1. A filtration mask for a digital display device to provide a three dimensional (3D) view of an image, the filtration mask comprising:
a plurality of super masks arranged based on an aspect ratio of the digital display device, the display device having an array of pixels organized in rows and columns, each of the plurality of super masks including a left eye pixel mask visible to a left eye of a viewer and a right eye pixel mask visible to a right eye of the viewer, the left eye pixel mask and the right eye pixel mask being arranged in a predefined pattern; wherein
at least two super masks from amongst the plurality of super masks include the left eye pixel mask and the right eye pixel mask arranged in a mutually different predefined pattern;
the plurality of super masks each encompass a different square sub-array of the pixels of the display device;
the right eye pixel mask of each super mask is one of a plurality of right eye pixel masks of the super mask, and the right eye pixel masks are arranged within the super mask such that each right eye pixel mask is diagonally opposite to another right eye pixel mask; and
the left eye pixel mask of each super mask is one of a plurality of left eye pixel masks of the super mask, and the left eye pixel masks are arranged within the super mask such that each left eye pixel mask is diagonally opposite to another left eye pixel mask.

2. The filtration mask as claimed in claim 1, wherein the left eye pixel masks and the right eye pixel masks of each super mask are organized in one of a m*n and a m*m arrangement.

3. The filtration mask as claimed in claim 1, wherein the different square sub-array of the pixels of the display device encompassed by each super mask comprises a number of the rows of the array of the pixels of the display device and an equal number of the columns of the array of the pixels.

4. A digital display device for providing three dimensional (3D) view of an image, the digital display device comprising:
a plurality of pixels arranged based on an aspect ratio of the digital display device to display the image and organized within an array of rows and columns; and a filtration mask arranged over the plurality of pixels to filter light such that a first set of pixels from amongst the plurality of pixels are visible to a left eye of a viewer and a second set of pixels from amongst the plurality of pixels are visible to a right eye of the viewer, wherein the filtration mask comprises a plurality of super masks arranged based on the aspect ratio of the digital display device, each of the plurality of super masks is to filter light such that a pixel from the first set of pixels and a pixel from amongst the second set of pixels is visible in a predefined pattern within the super mask, and wherein at least two super masks from amongst the plurality of super masks are to filter light such that the pixel from the first set of pixels and the pixel from the second set of pixels are visible in a mutually different predefined pattern;

the plurality of super masks each encompass a different square sub-array of the pixels of the display device;

the first set of pixels of each super mask is one of a plurality of first sets of pixels of the super mask, and the first sets of pixels are arranged within the super mask such that each first set of pixels is diagonally opposite to another first set of pixels; and the second set of pixels of each super mask is one of a plurality of second sets of pixels of the super mask, and the second sets of pixels are arranged within the super mask such that each second set of pixels is diagonally opposite to another second set of pixels.

5. The digital display device as claimed in claim 4, wherein each of the plurality of super masks is to filter light such that one of a m*n and a m*m arrangement of the first set of pixels and the second set of pixels is visible to the viewer.

6. The digital display device as claimed in claim 4, wherein each super mask is to filter light such that the pixel from the first set of pixels is visible diagonally opposite to the pixel from amongst the second set of pixels within the super mask.

7. The digital display device as claimed in claim 4, wherein each super mask is to filter light such that the pixel from the first set of pixels and the pixel from amongst the second set of pixels are randomly visible to the viewer within the super mask.

8. The digital display device as claimed in claim 4, wherein the different square sub-array of the pixels of the display device encompassed by each super mask comprises a number of the rows of the array of the pixels of the display device and an equal number of the columns of the array of the pixels.

9. A method of fabricating a filtration mask to provide three dimensional (3D) view of an image, the method comprising:

forming a plurality of super masks by arranging a left eye pixel mask visible to a left eye of a viewer and a right eye pixel mask visible to a right eye of the viewer, in a predefined pattern, wherein at least two super masks from amongst the plurality of super masks include the right eye pixel mask and the left eye pixel mask arranged in mutually different predefined pattern; and arranging the plurality of super masks, based on aspect ratio of a digital display device having an array of pixels organized in rows and columns, to form the filtration mask, each super mask encompassing a different square sub-array of the pixels of the display device, wherein the right eye pixel mask of each super mask is one of a plurality of right eye pixel masks of the super mask, and the right eye pixel masks are arranged within the super mask such that each right eye pixel mask is diagonally opposite to another right eye pixel mask, and wherein the left eye pixel mask of each super mask is one of a plurality of left eye pixel masks of the super mask, and the left eye pixel masks are arranged within the super mask such that each left eye pixel mask is diagonally opposite to another left eye pixel mask.

10. The method as claimed in claim 9, the method further comprising arranging the filtration mask onto the digital display device.

11. The method as claimed in claim 9, wherein the left eye pixel masks and the right eye pixel masks of each super mask are organized in one of a m*n and a m*m arrangement.

12. The method as claimed in claim 9, wherein the different square sub-array of the pixels of the display device encompassed by each super mask comprises a number of the rows of the array of the pixels of the display device and an equal number of the columns of the array of the pixels.

* * * * *